ately 20,000.

United States Patent [19]

Greco et al.

[11] Patent Number: 4,746,702
[45] Date of Patent: May 24, 1988

[54] FLUID ORGANOSILICONIC COMPOSITION AND PROCESS FOR PREPARING IT

[75] Inventors: Alberto Greco, Dresano; Gabriele Lugli, San Donato Milanese, both of Italy

[73] Assignee: Enichem Sintesi S.p.A., Palermo, Italy

[21] Appl. No.: 3,079

[22] Filed: Jan. 14, 1987

[30] Foreign Application Priority Data

Jan. 15, 1986 [IT] Italy ............................... 19080 A/86

[51] Int. Cl.$^4$ .............................................. C08F 8/00
[52] U.S. Cl. .................... 525/100; 525/101; 525/102; 525/104; 525/106; 525/479; 526/279
[58] Field of Search ............... 525/479, 104, 106, 101, 525/102, 100; 526/279

[56] References Cited

U.S. PATENT DOCUMENTS 4,518,766  5/1985  Greco et al. ......................... 528/29

OTHER PUBLICATIONS

McGraw-Hill, Dictionary of Scientific and Technical Terms, Third Edition, (1984), McGraw-Hill Book Company, New York, p. 1731.

*Primary Examiner*—Melvyn I. Marquis
*Attorney, Agent, or Firm*—Hedman, Gibson, Costigan & Hoare

[57] ABSTRACT

An organosiliconic fluid composition, suitable for use in sealants, formed by a liquid phase and by a solid and insoluble polymeric phase, dispersed in said liquid phase, is obtained by polymerizing, under the influence of free-radical initiators, styrene, or a mixture of styrene with at least one other vinyl-containing monomer, the polymerization being carried out in the presence of a liquid polyoxypropylenediol-α,ω-bis-allyl silylate having formula (I):

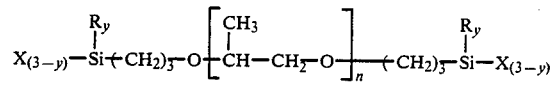

or in the presence of a liquid polycarbonate of polyoxypropylenediol-α,ω-bis-allyl silylate having formula (II):

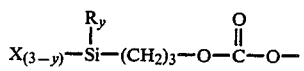

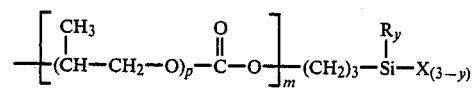

wherein:
R is an alkyl radical,
X is a hydrolyzable radical selected from alkoxy, aminooxy and acyloxy radicals,
y is 0, 1 or 2,
p is a number ranging from about 10 to about 100,
m and n are numbers such as to give to compounds (I) and (II) a molecular weight value, or an average molecular weight value, of from 2000 to 20,000.

In said organoziliconic fluid composition, the solid phase is constituted by the product of styrene polymerization and by the product of copolymerization of said styrene with at least another vinylic monomer. The liquid phase is constituted by compound (I) or (II) and by the product of grafting of said monomers on compound (I) or (II).

11 Claims, No Drawings

FLUID ORGANOSILICONIC COMPOSITION AND PROCESS FOR PREPARING IT

The present invention relates to a fluid organosiliconic composition suitable for use in sealants, and to the process for preparing it.

In the art polyether compounds, in particular polypropylene oxide, functionalized at their chain ends with alkoxysilanic groups, are known, which are fluid under ambient conditions and are able to crosslink, due to the effect of atmospheric moisture, into elastomers endowed with interesting characteristics, however such to render them useful in sealant compositions, especially suitable in building field, in glass industry, etc. Reference is made, in this regard, to the paper by J. Bela, J. P. Kennedy and V. C. S. Chang, J. Polymer Sci., 118 (A) 3177 (1980).

In U.S. Pat. No. 4,518,766, the preparation is disclosed of a polyoxyalkylenediol-α,ω-bis-allyl polycarbonate to be defined by the general formula:

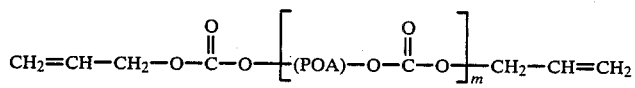

wherein POA is a polyoxyalkylene radical, easily transformable into the corresponding organosiliconic derivative, bearing alkoxysilanic groups on chain ends.

These organosiliconic derivatives are used in sealant compositions, generally in combination with one or more of following additives: extender pigments (as calcium carbonate), reinforcer fillers (as thermal silica), covering pigments (as titanium dioxide), thixotropic agents, plastifier agents, stabilizer agents (such as antioxidizers and U.V. absorbers), and small amounts of a crosslinking-accelerator catalyst.

The organosiliconic derivative, which can be obtained by silylating the polyoxyalkylenediol-α,ω-bis-allyl polycarbonate of above cited U.S. Patent is able to crosslink, due to the effect of atmospheric moisture, to yield elastomers which typically have characteristics of ultimate tensile stress of from about 4 to about 6 kg/cm² and of elongation at break of from about 160 to about 200%, when these tests are carried out on specimens having a 2-mm thickness.

A similar behaviour is shown by the polyethers functionalized at their chain end with alkoxysilanic groups, which have been previously mentioned.

These characteristics are adequate for the normal uses in sealant compositions, whilst the need has been felt for having available improved compositions for those applications which require particularly high characteristics of sealant strength.

A purpose of the present invention is satisfying this requirement of the prior art.

More particularly, a purpose of the present invention is a fluid organosiliconic composition able to set, under the influence of atmospheric moisture, to yield elastomers having a unique combination of such characteristics as ultimate tensile strength, elongation at break and shear stress.

Another purpose of the present invention is the process for the preparation of such an organosiliconic fluid composition.

A further purpose of the present invention is the use of such organosiliconic fluid composition in sealants.

Still other purposes of the invention shall be clear from the following disclosure.

In particular, the organosiliconic fluid composition of the present invention is formed by a liquid phase and by a solid polymeric phase, insoluble and dispersed in said liquid phase, and is obtained by polymerizing, under the influence of free-radical initiators, styrene, or a mixture of monomers containing at least 15% by weight of styrene, the remaining percentage being constituted by one or more other vinylic or acrylic monomer, the polymerization being carried out in the presence of a liquid polyoxypropylenediol-α,ω-bis-allyl silylate having formula (I):

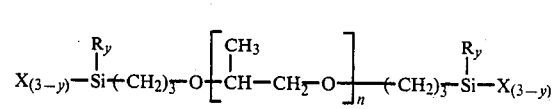

or in the presence of a liquid polycarbonate of polyoxypropylenediol-α,ω-bis-allyl silylate having formula II:

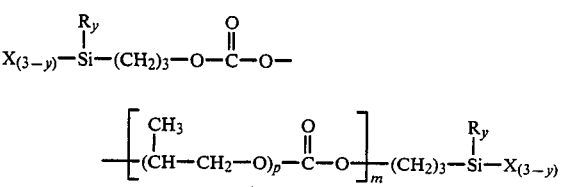

wherein:

R is an alkyl ($C_1$–$C_{10}$) radical;
X is a hydrolyzable radical selected from ($C_1$–$C_{10}$)alkoxy, aminooxy and acyloxy radicals;
y is 0, 1 or 2;
p is a number ranging from about 10 to about 100;
m and n are integers such to give to compounds (I) and (II) a molecular weight value, or an average molecular weight value, of from 2000 to 20,000;

the polymerization being continued until an amount of from 5 to 50% by weight of solid and dispersed phase is formed in the composition.

By operating as indicated, a major amount of styrene, or of mixture of styrene-containing monomers, polymerizes to yield a solid and dispersed polymer, whilst a minor portion is grafted onto compound (I) or (II).

Thus, in the compositions of the present invention, the solid dispersed phase is constituted by the product of styrene copolymerization, or of the copolymerization of the styrene-containing mixture, and the liquid phase is constituted by the product of grafting of said monomers onto compound (I) or (II), with the grafting degree ranging from about 0.1 to about 5% by weight, relative to the weight of said compounds (I) and (II).

In general, the organosiliconic fluid composition of the present invention has a viscosity of from 5000 to 100,000 cps at the temperature of 25° C.

In the preferred form of embodiment, in compounds (I) and (II):

R is a methyl radical;
X is a methoxy radical;
Y is 1;

p ranges from 40 to 80;

m and n are numbers, having such a value as to yield to compound (I) and (II) a value of molecular weight of from about 4000 to about 20,000.

Always in its preferred form of practical embodiment, the organosiliconic fluid composition of the present invention has values of viscosity of from 10,000 to 50,000 cps at the temperature of 25° C.

According to the process of the present invention, styrene, or the mixture of monomers containing at least 15% by weight of styrene is polymerized by operating in the presence of compound (I) or (II).

The vinyl-functional monomers, different from styrene, which can be used to that purpose, are: α-methylstyrene, vinyltoluene, vinylnaphthalene, divinylbenzene, vinyl chloride, vinyl acetate, acrylonitrile, methacrylonitrile, methyl acrylate, butyl acrylate, hydroxyethyl acrylate, ethyl acrylate, glycidyl acrylate, diethylene glycol diacrylate, trimethylolpropane triacrylate, hexanediol diacrylate, γ-trimethoxypropyl metacrylate, vinyl pyrrolidone, diallyl phthalate, diallyl maleate and diallyl succinate.

In the preferred form of embodiment, styrene is used, or mixtures of styrene are used, which contain one or more of following monomers: acrylonitrile, ethyl acrylate, methyl acrylate, butyl acrylate and diallylphthalate.

In the reaction, furthermore, an amount of styrene monomer or a mixture of styrene and other vinyl-containing monomers of from 5 to 60 parts, and preferably of from 5 to 40 parts by weight per each 100 parts by weight of compound (I) or (II) is used.

The free-radical initiators useful for the purpose are azocompounds or peroxy compounds and, in particular, diacylperoxides, peroxyesters (including peroxycarbonates), ketone peroxides, peroxyketals and hydroperoxides. Specific examples of such catalysts are azobisisobutyronitrile, azobispropionitrile, benzoyl peroxide, 2,4-dichlorobenzoyl peroxide, di-n-propylperoxydicarbonate, di(2-phenoxy)peroxydicarbonate, acetyl peroxide, acetyl-cyclohexylsulphonyl peroxide, α-cumylperoxide-neodecanoate, tertamylperoxide-neodecanoate and tert-butyl hydroperoxide.

Conveniently, an amount of free-radical initiator of from 0.1 to 5% by weight relatively to charged monomer or monomers is used.

In the preferred form of embodiment, free-radical initiators having half-life time lower than 1 hour at 100° C. are used, so to minimize the degradation effects caused by the same initiators on compounds (I) and (II). For that purpose, it can be useful to add small amounts of co-catalysts, generally constituted by organic salts of metals of Group IV of the periodic system, or of transition metals, in order to facilitate the decomposition of the initiator and consequently reduce the reaction temperature.

As an alternative to free-radical initiators, the polymerization of monomers can be carried out under the influence of radiation (U.V. light; E.B.; Gamma-rays). In case of U.V. polymerization, use of photosensitizers can be convenient.

The use of a solvent in the process of the present invention is not usually necessary. However, it can be sometimes useful to reduce the viscosity of the reaction mass, to facilitate preparation of the composition of present invention. In such a case, small amounts of one or more inert solvents can be added, i.e., solvents not damaging the alkoxy functionality in compound (I) and (II), not interfering with the free-radical initiator, or which have a low enough boiling point, to allow them to be easily removed from the reaction mass at the end of the reaction. Such solvents are generally of hydrocarbon or etheral type, such as methylcyclohexane and tetrahydrofuran.

If so required, to the reaction mixture one or more chain terminator(s) or molecular weight regulator(s) may be added, which are usually selected from mercaptans, such as dodecylthiol, γ-mercaptopropyltrimethoxysilane and γ-mercaptopropylmethyldimethoxysilane. These molecular weight control agents, used in small amounts, can be helpful to reduce the viscosity of the compositions obtained according to the process of the instant invention.

Conveniently, the reaction is carried out under anhydrous conditions, because of the sensitity to hydrolysis of alkoxysilane groups of compound (I). However, water traces may be tolerated, on condition that they are lower than about 200 ppm.

The reaction temperatures range conveniently within the range of from 40° to 110° C., and preferably of from 60° to 100° C.

Although the order of addition of the reactants is not critical, in the preferred form of embodiment, to compound (I) or (II) the initiator-containing monomer, or monomers mixture, is added, with effective stirring being maintained. The addition of this monomer, or of these monomers, is carried out gradually, e.g., within a time of from 0.5 to 2 hours. At the end of the addition, the reaction mass is maintained under reaction conditions for a further time of 1–4 hours, to complete, or substantially complete, the reaction.

According to an alternative route, the monomers may be added in a sequential way. For example, styrene can be initially added and, after styrene polymerization completion, the other monomers may be added.

Then, it is convenient to increase the temperature, e.g., by 20°–30° C. above the reaction temperature, in order to destroy the possible catalyst traces, and finally any unreacted monomers are removed, as well as any optional solvent, by operating at a lower than atmospheric pressure.

According to a particular form of practical embodiment of the present invention, styrene and acrylic monomer, preferably phenoxyethylacrylate, are sequentially polymerized, in order to obtain the following advantages:

a further improvement in compositions rheological properties;

an improvement of compositions elastomeric properties, after the crosslinking, as expressed by the ultimate tensile stress and percent elongation;

an improvement to materials physical characteristics, in particular, to obtain low water absorption values.

In such way, the organosiliconic fluid composition of the present invention is obtained, in the form of a fluid and stable composition, which can be used as a normal liquid, reactive polymer, for use in sealants.

This composition can be compounded with mineral fillers, with plastifier and thixotropic agents, with additives suitable to increase the tackiness characteristics or to promote the adhesion, with light and oxidation stabilizers, and with crosslinking accelerators, etc., as a function of the particular applications it is intended for.

In any case, the organosiliconic fluid composition of the instant invention yields, after crosslinking under ambient humidity and temperature conditions, elastomeric products having unexpected improved characteristics over those of compounds which can be obtained by crosslinking, under the same conditions, compound (I) or (II).

In the following experimental examples, given to illustrate and not to limit the present invention, the organosiliconic fluid composition according to the present invention is prepared, and to such a composition are added: 1.5% by weight of tin dibutyldilaurate and 0.5% by weight of cyclohexylamine, as catalysts, and 1% by weight of an antioxidizer. The crosslinking is then carried out, after laying off the resulting composition, to form a specimen having 2-2.5 mm of thickness. Specimens crosslinking is carried out at ambient temperature and humidity (20°-23° C.; about 50% of relative humidity) for 30 days. The specimens are then submitted to the following tests, in which the tensile tests are carried out at the speed of 50 mm/min.

AR: Elongation at break (%)
ST: Skin time (hours)
CR: ultimate tensile strength (kg/cm$^2$)
  standard: ASTM D-412
TR: shear strength (kg/cm)
  standard: ASTM D-624
D: hardness (Shore A)
  standard: ASTM D2240
d: specific gravity (g/ml)
gel: % by weight of residue on extraction with toluene at +25° C. for 48 hours.

EXAMPLE 1

To a 4-neck glass flask, equipped with nitrogen inlet system, dripping funnel and mechanical blade stirrer, 140 g is added of polyoxypropylenediol-α,ω-bis-allyl silylate, corresponding to compound (II), wherein R=methyl; y=1 and X=OCH$_3$.

This product shows the following characteristics:
viscosity, cps (at 25° C.): 12,000
number average molecular weight Mn: about 7500
unsaturations (meq/g): lower than 0.02
and, after crosslinking under the conditions as indicated in the description, has the following characteristics:
CR: 5.4
AR: 175
TR: lower than 1
D: 18
gel: 85

The flask is then dipped into an oil bath maintained at 82±1° C. and, through the dripping funnel, a solution of 0.15 g of benzoyl peroxide in 42.4 g of freshly-distilled styrene is gradually added over a 40-minutes time, while the mass being maintained efficaciously stirred. The reaction is continued up to a total time of 4 hours, and the temperature of the mass is then increased to 100° C. for 30 minutes. A reaction product is thus obtained, which has the appearance of a milky and thick fluid, with a viscosity of 30,000 cps at 25° C., and with an ST value of 24.

After crosslinking, carried out as indicated in the description, a crosslinked product is obtained, which has the following characteristics:
CR: 17.8
AR: 160
TR: 7.5
D: 30
d: 1.02
gel: 68

In this Example, polystyrene is 23.4% by weight of composition, the grafted percentage being lower than 5% by weight relative to total polystyrene, as evaluated on gel.

EXAMPLE 2

The process is carried out as described in Example 1, by starting from 100 g of compound (II) as described in said Example, and using 42 g of styrene and 0.15 g of dibenzoyl-peroxide.

A fluid organosiliconic composition is obtained, which has a viscosity of 50,000 cps at 25° C. and which, after crosslinking, has the following characteristics:
CR: 20.34
AR: 200
TR: 7.46
D: 32
d: 1.03
gel: 66.7

In this Example, polystyrene is 29.6% by weight of composition, the grafted percentage being lower than 5% by weight relative to total polystyrene, as evaluated on the gel.

EXAMPLE 3

The process is carried out as described in Example 1, by starting from 100 g of compound (II), wherein R=methyl, Y=1 and X=OCH$_3$, and furthermore having the following further characteristics:
viscosity, cps (at 25° C.): 24,000
number average molecular weight: about 10,500
unsaturations (meq/g): lower than 0.02%.

This compound (II) shows, after crosslinking, the following characteristics:
CR: 5.6
AR: 180
D: 17
gel: 86

The reaction is carried out with 30 g of styrene, 10 g of acrylonitrile and 80 mg of dibenzoylperoxide, an organosiliconic fluid composition being obtained with characteristics of viscosity of 42,000 cps at 25° C., and of ST of 48.

After crosslinking, the following characteristics are detected:
CR: 14.6
AR: 100
TR: 7.33
D: 45
d: 1.02
gel: 66

In this Example, styrene-acrylonitrile copolymer is 28% by weight of composition, the grafted percentage being lower than 5% by weight relative to same copolymer, as evaluated on gel.

EXAMPLE 4

Compound (II) as described in Example 3 is used and the reaction is carried out as described in Example 1, butyl acrylate (10 g), methyl acrylate (7 g), ethyl acrylate (5 g), styrene (5 g) and dibenzoylperoxide (0.150 g) being used.

An organosiliconic fluid composition is obtained which, after crosslinking, has the following characteristics:
CR: 4.36
AR: 327
TR: 1.85

D: not determined
d: not determined
gel: not determined

In this Example, the copolymer deriving from the monomers is 21% by weight of composition, the grafted percentage being lower than 5% by weight relative to same copolymer, as evaluated on gel.

EXAMPLE 5

A polyoxypropylenediol-α,ω-bis-allyl silylate is used, which corresponds to compound (I), with R=—CH$_3$, X=OCH$_3$ and Y=1, having number average molecular weight of 8500, and containing 75% of theoretical functionality on chain end.

This compound (I), after crosslinking under such conditions as indicated in the description, has the following characteristics:
CR: 5.3
AR: 200
gel: 83

120 g of said compound (I) is grafted with styrene (13.4 g) under such conditions as described in Example 1, and a composition having a viscosity of 32,000 cps at 25° C. is obtained.

After crosslinking, according to the same modalities, the following characteristics are detected:
ST: lower than 1
CR: 9.7
AR: 190
D: 27
gel: 77

EXAMPLES NOS. 6 to 12

To a 4-neck glass flask as described in Example 1, there were charged the same polymer as used in Example 1, methanol (0.5 ml) and n-butanol (1 ml). The product was dipped into a heater oil bath and heated to an inner temperature of 80° C. From the dripping funnel, the styrene, which contained dissolved benzoylperoxide, was gradually fed over a 30-minutes time, with an efficacious stirring being maintained. The reaction was continued at 80° C. and stirring was continued over the next two hours, after which over a 20-minutes time, the phenoxyacrylate containing dissolved the residual benzoylperoxide was fed, with the same temperatures and stirring speeds being maintained during the next two hours after addition completion.

The suspensions obtained in liquid polymeric carrier were then cooled to room temperature and so stored.

Synthesis conditions, reactants amounts and viscosities of the suspensions in fluid polymeric medium are shown in Table 1.

To the fluid compositions antioxidizers (Irganox 1076, 1% by weight and U.V. absorber, 1% by weight) and catalyst (tin dibutyldilaurate and laurylamine) were added, and the compositions were crosslinked at leased 30 days at room temperature and humidity, after being laid off to a 2-mm thickness. The results of characterization tests are reported in Table 2.

TABLE 1

| Example No. | Silylated Polymer (g) | Styrene (g) | BPD in Styrene (g) | Phenoxyethyl Acrylate (g) | BPD in Acrylate (g) | Stirrer rpm | Polymer in the Fluid (% by weight) | Viscosity (MPa) |
| --- | --- | --- | --- | --- | --- | --- | --- | --- |
| 6 | 120 | 35.3 | 0.20 | 10 | 0.05 | 450 | 21.4 | 52,000 |
| 7 | 120 | 35.3 | 0.15 | 10 | 0.05 | 450 | 21.4 | 68,000 |
| 8 | 120 | 35.3 | 0.25 | 10 | 0.01 | 450 | 21.4 | 67,000 |
| 9 | 120 | 29.9 | 0.1 | 10 | 0.05 | 650 | 18.7 | 68,000 |
| 10 | 120 | 35.3 | 0.10 | 5 | 0.10 | 450 | 22.0 | 51,000 |
| 11 | 120 | 29.9 | 0.10 | 5 | 0.05 | 650 | 19.3 | 44,000 |
| 12 | 120 | 26.7 | 0.1 | 10 | 0.1 | 450 | 17 | 42,000 |

TABLE 2

| Example No. | Catalyst Tin dibutyl dilaurate (% by weight) | Catalyst Lauryl-amine | Gel (%) | C.R. (kg/cm$^2$) | Modulus at 100% (kg/cm$^2$) | A.R. (%) | T.R. (kg/cm$^2$) | D (Shore A) | Water absorption, % by weight |
| --- | --- | --- | --- | --- | --- | --- | --- | --- | --- |
| 6 | 1 | 0.5 | 94 | 44.6 | 8.9 | 305 | 5.29 | 40 | 4 |
| 7 | 1 | — | 89 | 39.6 | 10.6 | 306 | | 31 | 2.5 |
| 8 | 1 | — | 91 | 34 | 9.2 | 258 | | 36 | 3.7 |
| 9 | 1 | — | 90 | 32.8 | 8.0 | 292 | | 29 | — |
| 10 | 1 | 0.5 | 94 | 21.9 | 8.9 | 237 | | 35 | 4 |
| 11 | 1 | — | 89 | 35.3 | 8 | 300 | | 34 | 2.8 |
| 12 | 1 | — | 91 | 24.6 | 7.6 | 237 | | 29 | 2 |

We claim:
1. An organosiliconic fluid composition comprising a liquid phase and a solid polymeric phase, which solid polymeric phase is isoluble and dispersed in said liquid phase, said fluid composition having a viscosity of from 5,000 to 100,000 cps at the temperature of 25° C., wherein said fluid composition is obtained by polymerizing, under the influence of free-radical initiators, styrene, or a mixture of one or more vinyl-functional monomers containing at least 15% by weight of styrene, in the presence of a liquid polyoxyproplyenediol-α,ω-bis-allyl silylate having formula (I):

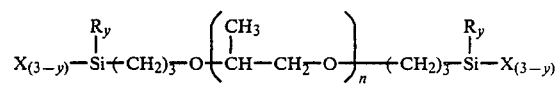

or in the presence of a liquid polycarbonate of polyoxypropylenediol-α,ω-bis-allyl silylate having formula (II):

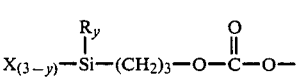

-continued

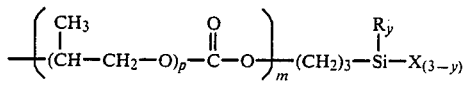

wherein:
R is an alkyl ($C_1$–$C_{10}$) radical;
X is a hydrolyzable radical selected from alkoxy, aminooxy or acyloxy radicals;
y is 0, 1 or 2;
p is a number ranging from about 10 about 100;
m and n are integers such as to give to compounds (I) and (II) an average molecular weight of from 2000 to 20,000;
the polymerization being continued until an amount of from 5 to 50% by weight of the solid and dispersed phase is formed in the composition.

2. A composition according to claim 1, wherein in said compounds (I) and (II):
R is a methyl radical;
X is a methoxy radical;
y is 1;
p has a value ranging from 40 to 80;
m and n are such integers as to give to compound (I) and (I) an average molecular weight of from about 4000 to about 20,000.

3. A composition according to claim 1, wherein the vinyl-functional monomers, different from styrene, are selected from acrylonitrile, methyl acrylate, ethyl acrylate, butyl acrylate or diallylphthalate.

4. A composition according to claim 1, wherein the polymerization is carried out with an amount of styrene, or a mixture of styrene and one or more vinyl-functional monomers, of from 5 to 60 parts by weight per each 100 parts by weight of compound (I) or (II), with an amount of free-radical initiator of from 0.1% to 5% by weight relative to said styrene or said mixture, at a temperature of from 40° to 110° C., until an amount of solid polymeric phase of from 5 to 50% by weight is formed in the composition.

5. A composition according to claim 1, wherein the free-radical initiator is selected from azo compounds, diacylperoxides, peroxyesters, ketone peroxides, peroxyketals and hydroperoxides, having a half-life time shorter than 1 hour at temperatures lower than 100° C.

6. A composition according to claim 1, wherein the polymerization is carried out in the presence of an inert solvent.

7. A composition according to claim 1, wherein the polymerization is carried out in the presence of a molecular weight regulator selected from dodecylthiol, γ-mercaptopropyltrimethoxysilane or γ-mercaptopropylmethyldimethoxysilane, in an amount effective to reduce the viscosity of the composition.

8. A composition according to claim 1, wherein the polymerization is carried out by initially adding and polymerizing styrene and then the other monomers.

9. A composition according to claim 4, wherein the amount of said styrene or said mixture of styrene and vinyl-functional monomers is from 5 to 40 parts by weight, per each 100 parts by weight of compound (I) or (II).

10. A composition according to claim 4, wherein said polymerization is carried out at a temperature of from 60° to 100° C.

11. A sealant crosslinkable under ambient conditions of temperature and humidity comprising an organosiliconic fluid composition as defined in any one of claims 1 to 7, and, optionally, pigments, mineral fillers, plastifiers, thixotriopic agents, adhesion promoters, tack promoters, light stabilizers, antioxidants, or crosslinking accelerators.

* * * * *